United States Patent
Nieddu et al.

(10) Patent No.: US 10,233,861 B2
(45) Date of Patent: Mar. 19, 2019

(54) METHOD OF OPERATING AN INTERNAL COMBUSTION ENGINE

(71) Applicant: GM GLOBAL TECHNOLOGY OPERATIONS LLC, Detroit, MI (US)

(72) Inventors: Stefano Nieddu, Turin (IT); Andrea Mollar, La Loggia (IT)

(73) Assignee: GM GLOBAL TECHNOLOGY OPERATONS LLC, Detroit, MI (US)

( * ) Notice: Subject to any disclaimer, the term of this patent is extended or adjusted under 35 U.S.C. 154(b) by 0 days.

(21) Appl. No.: 15/648,069

(22) Filed: Jul. 12, 2017

(65) Prior Publication Data

US 2018/0017010 A1    Jan. 18, 2018

(30) Foreign Application Priority Data

Jul. 13, 2016   (GB) .................................. 1612146.9

(51) Int. Cl.
| | | |
|---|---|---|
| *F02M 1/00* | (2006.01) | |
| *F02D 41/38* | (2006.01) | |
| *F02D 41/40* | (2006.01) | |
| *F02M 59/10* | (2006.01) | |
| *F02M 63/02* | (2006.01) | |
| *F02D 41/14* | (2006.01) | |

(52) U.S. Cl.
CPC ..... *F02D 41/3872* (2013.01); *F02D 41/1401* (2013.01); *F02D 41/3809* (2013.01); *F02D 41/3845* (2013.01); *F02D 41/40* (2013.01); *F02D 41/401* (2013.01); *F02M 59/105* (2013.01); *F02M 63/0245* (2013.01); *F02D 41/3818* (2013.01); *F02D 41/3827* (2013.01); *F02D 2041/1433* (2013.01); *F02D 2200/0602* (2013.01); *F02D 2200/0616* (2013.01)

(58) Field of Classification Search
CPC ......... F02D 2200/0602; F02D 41/3845; F02D 17/023; F02D 41/0087; F02M 63/0265; F02M 37/0029; F02M 63/023
USPC ....... 123/325, 326, 445, 446, 456, 457, 481, 123/495, 511
See application file for complete search history.

(56) References Cited

U.S. PATENT DOCUMENTS

| | | |
|---|---|---|
| 5,771,861 A | 6/1998 | Musser et al. |
| 6,567,758 B1 | 5/2003 | Wuori |
| | (Continued) | |

FOREIGN PATENT DOCUMENTS

JP        2000257495 A     9/2000

OTHER PUBLICATIONS

United States Patent Office, United States Office Action for U.S. Appl. No. 15/004,408, dated Apr. 27, 2017.

(Continued)

*Primary Examiner* — John Kwon
(74) *Attorney, Agent, or Firm* — Lorenz & Kopf, LLP

(57) ABSTRACT

A method and apparatus are disclosed for determining the fuel quantity that is actually injected by a fuel injector in an internal combustion engine. A fuel injector is operated to perform a fuel injection. The first discharge stroke of the fuel pump is deactivated following a start of the fuel injection for preventing the discharge stroke from delivering fuel into the fuel rail. A value of a pressure drop caused into the fuel rail by the fuel injection is calculated. A value of a fuel quantity injected by the fuel injection is calculated on the basis of the calculated value of the pressure drop.

14 Claims, 4 Drawing Sheets

(56) References Cited

U.S. PATENT DOCUMENTS

| | | |
|---|---|---|
| 7,523,743 B1 | 4/2009 | Geveci et al. |
| 2004/0133350 A1 | 7/2004 | Veneruso et al. |
| 2008/0026095 A1 | 1/2008 | Wessely et al. |
| 2008/0107764 A1 | 5/2008 | MacDonald et al. |
| 2008/0276906 A1* | 11/2008 | Thomas .............. F02D 41/2438 123/457 |
| 2009/0164086 A1 | 6/2009 | Geveci et al. |
| 2009/0164094 A1 | 6/2009 | Geveci et al. |
| 2009/0164095 A1 | 6/2009 | Geveci et al. |
| 2010/0030450 A1 | 2/2010 | Doelker et al. |
| 2010/0147058 A1 | 6/2010 | Cinpinski et al. |
| 2010/0199951 A1 | 8/2010 | Cinpinski et al. |
| 2010/0206269 A1* | 8/2010 | Cinpinski ........... F02D 41/3854 123/456 |
| 2010/0222988 A1* | 9/2010 | Thomas .............. F02D 41/2438 701/103 |
| 2012/0118053 A1 | 5/2012 | Serra et al. |
| 2012/0123703 A1 | 5/2012 | Serra et al. |
| 2013/0311063 A1 | 11/2013 | Ito et al. |

OTHER PUBLICATIONS

Great Britain Patent Office, Great Britain Search Report for Great Britain Application No. 1612146.9, dated Jan. 30, 2017.

* cited by examiner

METHOD OF OPERATING AN INTERNAL COMBUSTION ENGINE

CROSS-REFERENCE TO RELATED APPLICATION

This application claims priority to British Patent Application No. 1612146.9, filed Jul. 13, 2016, which is incorporated herein by reference in its entirety.

TECHNICAL FIELD

The present disclosure pertains to a method of operating an internal combustion engine of a motor vehicle, such as a Diesel engine or a Gasoline engine, and more particularly, a method of determining the fuel quantity that is actually injected by a fuel injector.

BACKGROUND

It is known that an internal combustion engine of a motor vehicle generally includes a fuel injection system (FIS) including a fuel rail and a plurality of fuel injectors in fluid communication with the fuel rail and configured to perform fuel injections into the combustion chambers of the engine. The fuel injection system may further include a high pressure fuel pump, which may be embodied as a piston pump, driven by the engine and configured to perform a discharge stroke after every fuel injection, in order to deliver into the fuel rail a quantity of fuel that compensate for the injected fuel quantity.

The fuel injectors are essentially embodied as electromechanical valves having a needle, which is normally biased in a closed position by a spring, and an electro-magnetic actuator (e.g. solenoid), which moves the needle towards an open position in response to an energizing electrical current. The energizing electrical current is provided by an electronic control unit, which is generally configured to determine the fuel quantity to be injected by the fuel injection, to calculate the duration of the energizing electrical current (i.e. the energizing time) needed for injecting the desired fuel quantity, and finally to energize the fuel injector accordingly.

However, it may happen that the fuel quantity actually injected during a fuel injection is different from the desired fuel quantity. This unwanted condition may be caused by several factors, including drift of the injection characteristics and production spread of the fuel injectors. In particular, the correlation between the electrical command and the injector needle displacement can be affected by realities hard to control during injector manufacturing, such as magnetic permeability drift of the actuator, tolerance of the needle spring coefficient, aging effect, and temperature dependency. Accordingly, there is a need to provide a strategy for determining the quantity of fuel which is actually injected by a fuel injector during a fuel injection.

SUMMARY

An embodiment of the present disclosure provides a method of operating an internal combustion engine having a fuel rail in fluid communication with a number of (i.e. one or more) fuel injectors and a fuel pump configured to perform a discharge stroke after each fuel injection performed by the fuel injectors. In accordance with the method a fuel injector performs a fuel injection. The first discharge stroke of the fuel pump following a start of the fuel injection is deactivated for preventing the discharge stroke from delivering fuel into the fuel rail. A value of a pressure drop caused into the fuel rail by the fuel injection is calculated, and a value of a fuel quantity injected by the fuel injection is also calculated on the basis of the calculated value of the pressure drop.

As a result of the deactivation of the discharge stroke, the pressure level within the fuel rail during the fuel injection is only affected by the quantity of fuel which actually discharged from the fuel rail during that fuel injection. As a consequence, knowing the pressure drop caused into the fuel rail by the fuel injection, it is possible to calculate a reliable value of the fuel injected quantity.

The proposed strategy is reliable under every engine operating conditions and even when the engine is operating at high engine speed and high load (i.e. high injected fuel quantity). Indeed, under such conditions, it may happen that the discharge stroke of the fuel pump starts very close or even before the end of the fuel injection, so that it would be normally impossible, or at least extremely difficult, to distinguish the pressure effect caused by the fuel injection from the pressure effect caused by the fuel pump. With the present solution, which provides for deactivating the discharge stroke following the fuel injection, this side effect is positively solved.

According to an aspect of the method, the calculation of the pressure drop value may include measuring a first value of a fuel rail pressure before the start of the fuel injection and measuring a second value the fuel rail pressure after the end of the fuel injection. The pressure drop value is calculated as a difference between the first and the second measured value of the fuel rail pressure. This aspect provides a very simple and reliable way to calculate the pressure drop caused by the fuel injection.

According to another aspect of the method, the measurement of the first and the second value of the fuel rail pressure may include sampling a signal representative of the fuel rail pressure and filtering the signal to obtain a filtered signal. A first value of the filtered signal is measured before the start of the fuel injection, and a second value of the filtered signal is measured after the end of the fuel injection. The first value and the second value of the fuel rail pressure are calculated on the basis of the first and the second value of the filtered signal respectively. With the filtering phase, it is possible to remove the noises that can affect the pressure signal, thereby increasing the accuracy of the measurement of the first value and the second value of the fuel rail pressure.

An aspect of the method particularly provides that the filtering of the signal may be performed with a SINC filter, for example a SINC filter tuned on a dominant frequency of a pressure oscillation in the fuel rail. In this way the filtering of the pressure signal can be very effective and thus lead to reliable values of the fuel rail pressure.

According to another aspect of the method, the calculation of the pressure drop value may include sampling a signal representative of the fuel rail pressure during the fuel injection, The fuel rail pressure signal is used as input of a first integral transform yielding as output a value of a first function having as variables a fuel rail pressure drop caused by the fuel injection and a timing parameter indicative of an instant when the fuel injection started. The fuel rail pressure signal is also used as input of a second integral transform yielding as output a value of a second function having as variables the fuel rail pressure drop caused by the fuel injection and the timing parameter indicative of the instant when the fuel injection started. The value of the first function and the value of the second function are used to calculate the value of the fuel rail pressure drop. This solution provides an alternative but still reliable and effective strategy for determining the fuel quantity that is actually injected during a fuel injection. This peculiar strategy has also the effect of allowing the calculation of the instant when the fuel injection actually started, i.e. the so-called start of Injection (SOI). Moreover, this strategy is basically unaffected by the noises on the pressure signal, so that the filtration of such signal is not strictly required and the computation effort for carrying out the strategy can be positively reduced.

According to another aspect of the proposed solution, the method may include activating a number of (i.e. one or more) discharge strokes following the deactivated one by allowing each one of them to deliver fuel into the fuel rail. This aspect has the effect of increasing the fuel rail pressure after that the discharge stroke of the fuel pump has been deactivated (and before that another discharge stroke is deactivated to repeat the calculation of the fuel injected quantity if needed), thereby preventing the fuel rail pressure from becoming too low.

In this regard, an aspect of the method may provide that the number of activated pump strokes is equal to the number of fuel injectors. In this way, it is possible to calculate in sequence the quantity of fuel actually injected during fuel injections performed by different fuel injectors. Moreover, this solution guarantees that the deactivation of the discharge stroke of the fuel pump has not the same periodicity of the engine cycle, thereby preventing resonance effects on the engine torque.

Another aspect of the method may provide that the activation of each discharge strokes includes the step of delivering into the fuel rail a volume of fuel having a value $Q^*$ according to the following equation:

$$Q^* = \frac{n}{n-1} \cdot Q$$

wherein n is the number of fuel injectors and Q is a value of a fuel volume that would have been delivered if all the discharge strokes had been activated. This aspect guarantees that the fuel rail is supplied with the fuel quantity necessary to compensate for all the fuel injections performed during an engine cycle, notwithstanding one of the discharge strokes has been deactivated.

According to the present disclosure, the method may be carried out with the help of a computer program including a program-code for carrying out all the steps of the method described above, and in the form of a computer program product including the computer program. The method can be also embodied as an electromagnetic signal, the signal being modulated to carry a sequence of data bits which represent a computer program to carry out all steps of the method.

Another embodiment of the present disclosure provides an internal combustion engine including a fuel rail in fluid communication with a number of (i.e. one or more) fuel injectors and with a fuel pump configured to perform a discharge stroke after each fuel injection performed by the fuel injectors. An electronic control unit is configured to operate a fuel injector to perform a fuel injection, deactivate the first discharge stroke of the fuel pump following a start of the fuel injection, thereby by preventing the discharge stroke from delivering fuel into the fuel rail, calculate a value of a pressure drop caused into the fuel rail by the fuel injection, and calculate a value of a fuel quantity injected by the fuel injection on the basis of the calculated value of the pressure drop.

This solution achieves essentially the same effects of the method described above, in particular that of providing a reliable value of the fuel injected quantity under every engine operating conditions and even when the engine is operating at high engine speed and high load (i.e. high injected fuel quantity).

According to an aspect of the engine, the electronic control unit may be configured to calculate of the pressure drop value by measuring a first value of a fuel rail pressure before the start of the fuel injection, measuring a second value the fuel rail pressure after the end of the fuel injection, and calculating the pressure drop value as a difference between the first and the second measured value of the fuel rail pressure. This aspect provides a very simple and reliable way to calculate the pressure drop caused by the fuel injection.

According to another aspect of the engine, the electronic control unit may be configured to measure the first and the second value of the fuel rail pressure by sampling a signal representative of the fuel rail pressure, filtering the signal to obtain a filtered signal, measuring a first value of the filtered signal before the start of the fuel injection, measuring a second value of the filtered signal after the end of the fuel injection, and calculating the first value and the second value of the fuel rail pressure on the basis of the first and the second value of the filtered signal respectively. With the filtering phase, it is possible to remove the noises that can affect the pressure signal, thereby increasing the accuracy of the measurement of the first value and the second value of the fuel rail pressure.

An aspect of the engine particularly provides that the electronic control unit may be configured to filter the signal with a SINC filter, for example a SINC filter tuned on a dominant frequency of a pressure oscillation in the fuel rail. In this way the filtering of the pressure signal can be very effective and thus lead to reliable values of the fuel rail pressure.

According to another aspect of the engine, the electronic control unit may calculate the pressure drop value by sampling a signal representative of the fuel rail pressure during the fuel injection, using the pressure signal as input of a first integral transform yielding as output a value of a first function having as variables a fuel rail pressure drop caused by the fuel injection and a timing parameter indicative of an instant when the fuel injection started, using the pressure signal as input of a second integral transform yielding as output a value of a second function having as variables the fuel rail pressure drop caused by the fuel injection and the timing parameter indicative of the instant when the fuel injection started, using the value of the first function and the value of the second function to calculate the value of the fuel rail pressure drop. This solution provides an alternative but still reliable and effective strategy for determining the fuel quantity that is actually injected during a fuel injection. This peculiar strategy has also the effect of allowing the calculation of the instant when the fuel injection actually started, i.e. the so-called start of Injection (SOI). Moreover, this strategy is basically unaffected by the noises on the pressure signal, so that the filtration of such signal is not strictly required and the computation effort for carrying out the strategy can be positively reduced.

According to another aspect of the engine, the electronic control unit may be configured to activate a number of (i.e. one or more) discharge strokes following the deactivated one by allowing each one of them to deliver fuel into the fuel rail. This aspect has the effect of increasing the fuel rail pressure after that the discharge stroke of the fuel pump has been deactivated (and before that another discharge stroke is deactivated to repeat the calculation of the fuel injected quantity if needed), thereby preventing the fuel rail pressure from becoming too low.

In this regard, an aspect of the engine may provide that the number of activated pump strokes is equal to the number of fuel injectors. In this way, it is possible to calculate in sequence the quantity of fuel actually injected during fuel injections performed by different fuel injectors. Moreover, this solution guarantees that the deactivation of the discharge stroke of the fuel pump has not the same periodicity of the engine cycle, thereby preventing resonance effects on the engine torque.

Another aspect of the engine may provide that the electronic control unit is configured to activate each discharge strokes with the step of delivering into the fuel rail a volume of fuel having a value Q* according to the following equation:

$$Q^* = \frac{n}{n-1} \cdot Q$$

wherein n is the number of fuel injectors and Q is a value of a fuel volume that would have been delivered if all the discharge strokes had been activated.

This aspect guarantees that the fuel rail is supplied with the fuel quantity necessary to compensate for all the fuel injections performed during an engine cycle, notwithstanding one of the discharge strokes has been deactivated.

Still another embodiment of the present disclosure provides an apparatus including an internal combustion engine having a fuel rail in fluid communication with a number of (i.e. one or more) fuel injectors and with a fuel pump configured to perform a discharge stroke after each fuel injection performed by the fuel injectors. The apparatus is further configured to operate a fuel injector to perform a fuel injection, deactivate the first discharge stroke of the fuel pump following a start of the fuel injection, thereby by preventing the discharge stroke from delivering fuel into the fuel rail, calculate a value of a pressure drop caused into the fuel rail by the fuel injection, and calculate a value of a fuel quantity injected by the fuel injection on the basis of the calculated value of the pressure drop. This solution achieves essentially the same effects of the method described above, in particular that of providing a reliable prediction of the real exhaust gas temperature without delay.

According to an aspect of the apparatus may be further configured to measure a first value of a fuel rail pressure before the start of the fuel injection, measure a second value the fuel rail pressure after the end of the fuel injection, and calculate the pressure drop value as a difference between the first and the second measured value of the fuel rail pressure. This aspect provides a very simple and reliable way to calculate the pressure drop caused by the fuel injection.

According to another aspect of the apparatus may be configured to sample a signal representative of the fuel rail pressure, filter the signal to obtain a filtered signal, measure a first value of the filtered signal before the start of the fuel injection, measure a second value of the filtered signal after the end of the fuel injection, and calculate the first value and the second value of the fuel rail pressure on the basis of the first and the second value of the filtered signal respectively. With the filtering phase, it is possible to remove the noises that can affect the pressure signal, thereby increasing the accuracy of the measurement of the first value and the second value of the fuel rail pressure.

An aspect of the apparatus particularly provides for filtering the signal with a SINC filter, for example a SINC filter tuned on a dominant frequency of a pressure oscillation in the fuel rail. In this way the filtering of the pressure signal can be very effective and thus lead to reliable values of the fuel rail pressure.

According to another aspect of the method, the apparatus is configured to sample a signal representative of the fuel rail pressure during the fuel injection, use the pressure signal as input of a first integral transform yielding as output a value of a first function having as variables a fuel rail pressure drop caused by the fuel injection and a timing parameter indicative of an instant when the fuel injection started, use the pressure signal as input of a second integral transform yielding as output a value of a second function having as variables the fuel rail pressure drop caused by the fuel injection and the timing parameter indicative of the instant when the fuel injection started, and use the value of the first function and the value of the second function to calculate the value of the fuel rail pressure drop.

This solution provides an alternative but still reliable and effective strategy for determining the fuel quantity that is actually injected during a fuel injection. This peculiar strategy has also the effect of allowing the calculation of the instant when the fuel injection actually started, i.e. the so-called start of Injection (SOI). Moreover, this strategy is basically unaffected by the noises on the pressure signal, so that the filtration of such signal is not strictly required and the computation effort for carrying out the strategy can be positively reduced.

According to another aspect of the proposed solution, the apparatus may be configured to activate a number of (i.e. one or more) discharge strokes following the deactivated one by allowing each one of them to deliver fuel into the fuel rail. This aspect has the effect of increasing the fuel rail pressure after that the discharge stroke of the fuel pump has been deactivated (and before that another discharge stroke is deactivated to repeat the calculation of the fuel injected quantity if needed), thereby preventing the fuel rail pressure from becoming too low.

In this regard, an aspect of the apparatus may provide that the number of activated pump strokes is equal to the number of fuel injectors. In this way, it is possible to calculate in sequence the quantity of fuel actually injected during fuel injections performed by different fuel injectors. Moreover, this solution guarantees that the deactivation of the discharge stroke of the fuel pump has not the same periodicity of the engine cycle, thereby preventing resonance effects on the engine torque.

Another aspect of the apparatus may provide that the means for activating each discharge strokes includes means for delivering into the fuel rail a volume of fuel having a value Q* according to the following equation:

$$Q^* = \frac{n}{n-1} \cdot Q$$

wherein n is the number of fuel injectors and Q is a value of a fuel volume that would have been delivered if all the discharge strokes had been activated. This aspect guarantees that the fuel rail is supplied with the fuel quantity necessary to compensate for all the fuel injections performed during an engine cycle, notwithstanding one of the discharge strokes has been deactivated.

BRIEF DESCRIPTION OF THE DRAWINGS

The present disclosure will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Figure 1:
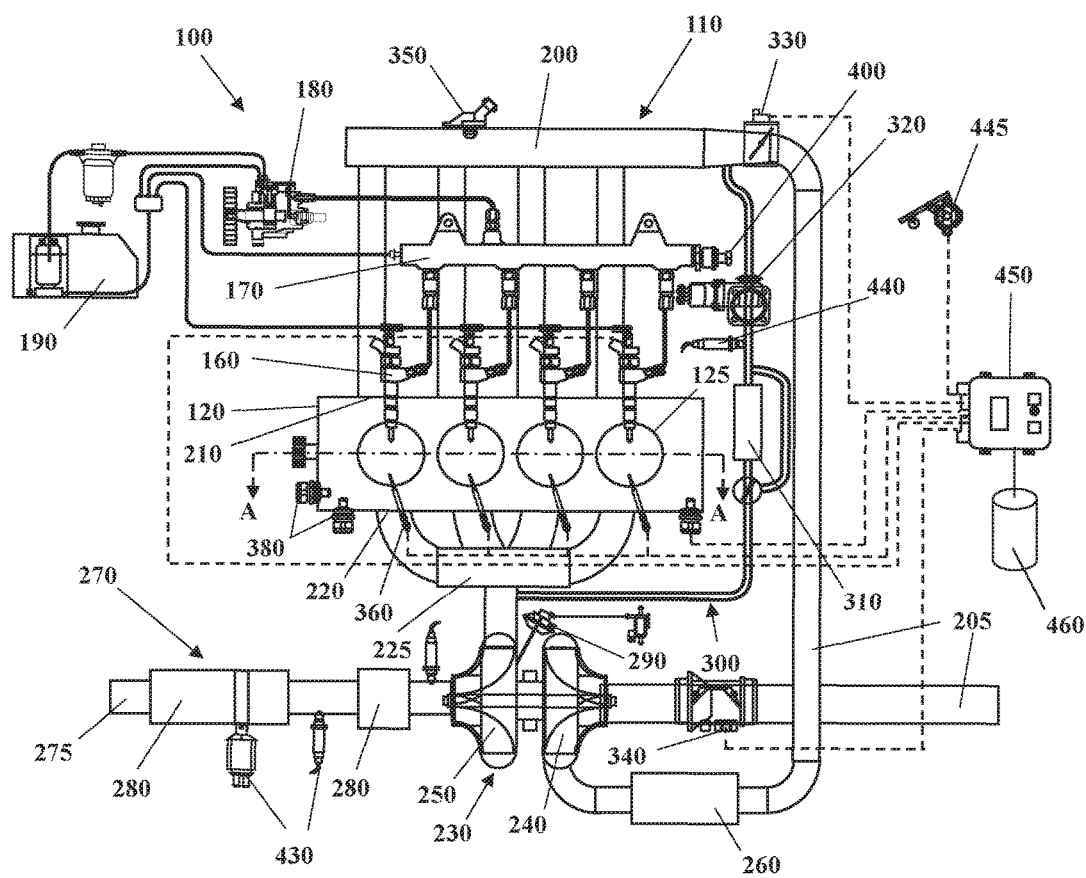
FIG. 1 schematically shows an automotive system.
Figure 2:
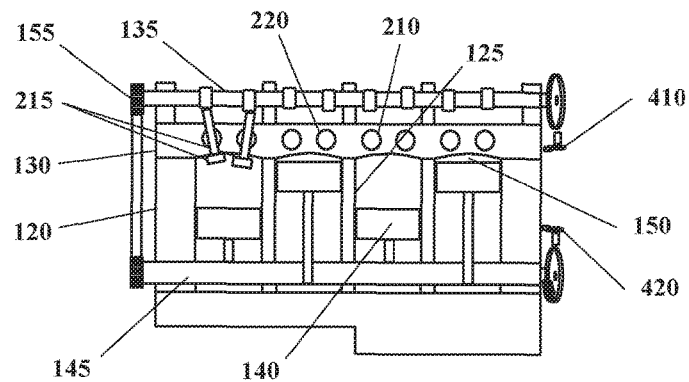
FIG. 2 shows an internal combustion engine of the automotive system according to the section A-A of FIG. 1.

Some embodiments may include an automotive system 100 (e.g. a motor vehicle), as shown in FIGS. 1 and 2, that includes an internal combustion engine (ICE) 110 having an engine block 120 defining at least one cylinder 125 having a piston 140 coupled to rotate a crankshaft 145. A cylinder head 130 cooperates with the piston 140 to define a combustion chamber 150. A fuel and air mixture (not shown) is disposed in the combustion chamber 150 and ignited, resulting in hot expanding exhaust gasses causing reciprocal movement of the piston 140. The fuel is provided by at least one fuel injector 160 per combustion chamber 150 and the air through at least one intake port 210. The fuel is provided at high pressure to the fuel injector 160 from a fuel rail 170 in fluid communication with a high pressure fuel pump 180 that increase the pressure of the fuel received from a fuel source 190.

Each of the cylinders 125 has at least two valves 215, actuated by a camshaft 135 rotating in time with the crankshaft 145. The valves 215 selectively allow air into the combustion chamber 150 from the port 210 and alternately allow exhaust gases to exit through a port 220. In some examples, a cam phaser 155 may selectively vary the timing between the camshaft 135 and the crankshaft 145.

The air may be distributed to the air intake port(s) 210 through an intake manifold 200. An air intake duct 205 may provide air from the ambient environment to the intake manifold 200. In other embodiments, a throttle body 330 may be provided to regulate the flow of air into the manifold 200. In still other embodiments, a forced air system such as a turbocharger 230, having a compressor 240 rotationally coupled to a turbine 250, may be provided. Rotation of the compressor 240 increases the pressure and temperature of the air in the duct 205 and manifold 200. An intercooler 260 disposed in the duct 205 may reduce the temperature of the air. The turbine 250 rotates by receiving exhaust gases from an exhaust manifold 225 that directs exhaust gases from the exhaust ports 220 and through a series of vanes prior to expansion through the turbine 250. The exhaust gases exit the turbine 250 and are directed into an exhaust system 270. This example shows a variable geometry turbine (VGT) with a VGT actuator 290 arranged to move the vanes to alter the flow of the exhaust gases through the turbine 250. In other embodiments, the turbocharger 230 may be fixed geometry and/or include a waste gate.

The exhaust system 270 may include an exhaust pipe 275 having one or more exhaust aftertreatment devices 280. The aftertreatment devices may be any device configured to change the composition of the exhaust gases. Some examples of aftertreatment devices 280 include, but are not limited to, catalytic converters (two and three way), oxidation catalysts, lean $NO_x$ traps, hydrocarbon adsorbers, selective catalytic reduction (SCR) systems, and particulate filters. Other embodiments may include an exhaust gas recirculation (EGR) system 300 coupled between the exhaust manifold 225 and the intake manifold 200. The EGR system 300 may include an EGR cooler 310 to reduce the temperature of the exhaust gases in the EGR system 300. An EGR valve 320 regulates a flow of exhaust gases in the EGR system 300.

The automotive system 100 may further include an electronic control unit (ECU) 450 in communication with one or more sensors and/or devices associated with the ICE 110. The ECU 450 may receive input signals from various sensors configured to generate the signals in proportion to various physical parameters associated with the ICE 110. The sensors include, but are not limited to, a mass airflow and temperature sensor 340, a manifold pressure and temperature sensor 350, a combustion pressure sensor 360, coolant and oil temperature and level sensors 380, a fuel rail pressure sensor 400, a cam position sensor 410, a crank position sensor 420, exhaust pressure and temperature sensors 430, an EGR temperature sensor 440, and an accelerator pedal position sensor 445. Furthermore, the ECU 450 may generate output signals to various control devices that are arranged to control the operation of the ICE 110, including, but not limited to, the fuel injectors 160, the throttle body 330, the EGR Valve 320, the VGT actuator 290 and the cam phaser 155. Note, dashed lines are used to indicate communication between the ECU 450 and the various sensors and devices, but some are omitted for clarity.

Turning now to the ECU 450, this apparatus may include a digital central processing unit (CPU) in communication with a memory system and an interface bus. The CPU is configured to execute instructions stored as a program in the memory system 460, and send and receive signals to/from the interface bus. The memory system 460 may include various storage types including optical storage, magnetic storage, solid state storage, and other non-volatile memory. The interface bus may be configured to send, receive, and modulate analog and/or digital signals to/from the various sensors and control devices. The program may embody the methods disclosed herein, allowing the CPU to carryout out the steps of such methods and control the ICE 110.

The program stored in the memory system 460 is transmitted from outside via a cable or in a wireless fashion. Outside the automotive system 100 it is normally visible as a computer program product, which is also called computer readable medium or machine readable medium in the art, and which should be understood to be a computer program code residing on a carrier, the carrier being transitory or non-transitory in nature with the consequence that the computer program product can be regarded to be transitory or non-transitory in nature.

An example of a transitory computer program product is a signal, e.g. an electromagnetic signal such as an optical signal, which is a transitory carrier for the computer program code. Carrying such computer program code can be achieved by modulating the signal by a conventional modulation technique such as QPSK for digital data, such that binary data representing the computer program code is impressed on the transitory electromagnetic signal. Such signals are e.g. made use of when transmitting computer program code in a wireless fashion via a WiFi connection to a laptop.

In case of a non-transitory computer program product the computer program code is embodied in a tangible storage medium. The storage medium is then the non-transitory carrier mentioned above, such that the computer program code is permanently or non-permanently stored in a retrievable way in or on this storage medium. The storage medium can be of conventional type known in computer technology such as a flash memory, an Asic, a CD or the like.

Instead of an ECU 450, the automotive system 100 may have a different type of processor to provide the electronic logic, e.g. an embedded controller, an onboard computer, or any processing module that might be deployed in the vehicle.

One of the tasks of the ECU 450 is that of operating the fuel injectors 160. In this regard, each fuel injector 160 may be embodied as an electromechanical valve having a nozzle in fluid communication with the corresponding combustion chamber 150, a needle, which is normally biased by a spring in a closed position of the nozzle, and an electro-magnetic actuator (e.g. solenoid), which moves the needle towards an open position of the nozzle in response of an energizing electrical current. This energizing electrical current may be provided by the ECU 450. In this way, any time the electro-magnetic actuator is provided with the energizing electrical current (also referred as to electrical command), a direct connection is opened between the fuel rail 170 and the cylinder 125, which let a certain quantity of fuel to be injected into the combustion chamber 150, thereby performing a so-called fuel injection. The fuel quantity injected into the combustion chamber 150 by a fuel injection generally depends on the pressure of the fuel in the fuel rail 170 and on the needle displacement, which is correlated with the duration of the electrical command (i.e. the so-called energizing time ET).

During the operation of the internal combustion engine 110, the ECU 450 usually command each one of the injectors 160 to perform at least one fuel injection in the corresponding combustion chamber 150, when the piston 140 is in proximity of the Top Dead Center (TDC) position, between the compression stroke and the expansion stroke. In case of a four-stroke engine, each fuel injector 160 is thus configured to perform at least one fuel injection every two complete rotations)(720° of the crankshaft 145. In addition, the fuel injections performed by each fuel injectors 160 are generally scheduled at different times with respect to the fuel injections performed by any other fuel injectors 160. As a consequence, considering the explanatory case of a four-cylinder engine, at least one fuel injection is performed every 180° rotation of the crankshaft 145 by a different fuel injector 160 in a different combustion chamber 150.

Figure 3:
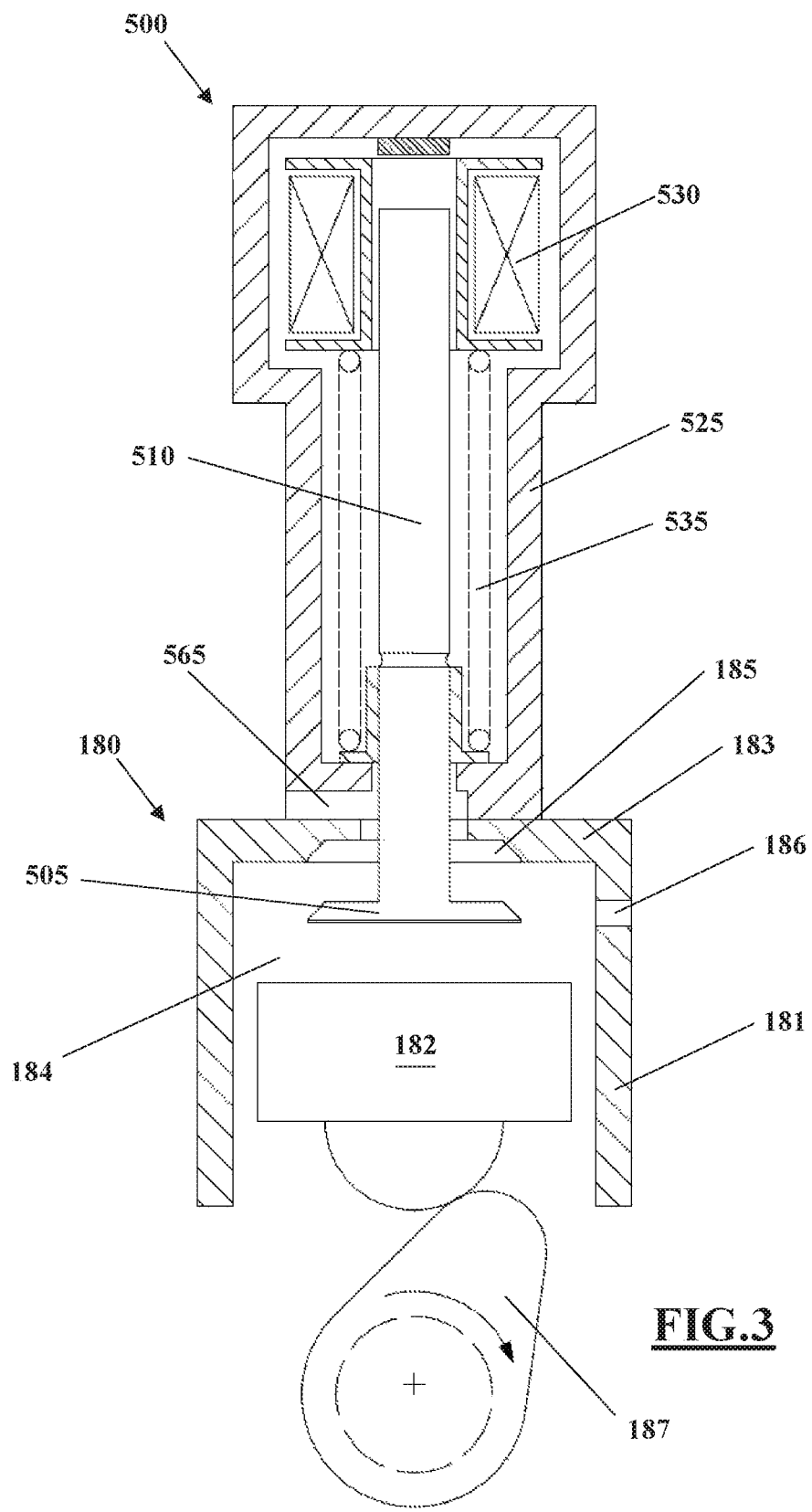
FIG. 3 is a schematic representation of a cross-section of the high pressure fuel pump of the automotive system of FIG. 1.

The fuel quantity discharged from the fuel rail 170 due to the fuel injections is compensated by the fuel pump 180. As shown in FIG. 3, the fuel pump 180 may be embodied as a volumetric pump having a cylinder 181 and a reciprocating piston 182 which is accommodated inside the cylinder 181. A cylinder head 183 cooperates with the cylinder 181 and the piston 182 to define an operating chamber 184. The operating chamber 184 is provided with a fuel inlet 185, which may be located in the cylinder head 183, and a fuel outlet 186, which may be located on the cylinder 181. The fuel inlet 185 is in fluid communication with the fuel source 190 and the fuel outlet 186 is fluid communication with the fuel rail 170. The fuel outlet 186 may be provided with an outlet valve (not shown), for example a check valve, that opens the communication with the fuel rail 170 when the pressure inside the operating chamber 184 exceeds a predetermined value.

The piston 182 moves within the cylinder 181 between a Top Dead Center (TDC) position, which corresponds to a minimum volume of the operating chamber 184, and a Bottom Dead Center (BDC) position, which corresponds to a maximum volume of the operating chamber 184. The piston 182 may be driven by the engine crankshaft 145 through a timing system, in the present example through a cam 187 rotating in time with the crankshaft 145. Due to the reciprocating movement of the piston 182, this component cyclically performs a suction stroke that fills the operating chamber 184 with the fuel coming from the fuel source 190, followed by a discharge stroke that delivers the fuel at high pressure inside the fuel rail 170. In particular, the kinematic connection between the cam 187 (or any other actuating means of the piston 182) and the crankshaft 145 is configured so that the piston 182 performs a discharge stroke after each fuel injection performed by any one of the fuel injectors 160 (e.g. any time that one of the engine pistons 140 is performing the expansion stroke). In the explanatory case of a four-stroke and four-cylinder engine, the kinematic connection is thus configured so that the piston 182 performs a discharge stroke every 180° rotation of the crankshaft 145.

A digital inlet valve 500 may cooperate with the fuel pump 180 to determine the amount of fuel which is actually admitted into the operating chamber 184 during the suction stroke of the piston 182. The digital inlet valve 500 may include a shutter 505 associated to the fuel inlet 185 of the high pressure pump 180. The shutter 505 may be provided with a shaft 510 which is accommodated in a valve housing 525 associated to the cylinder head 183. The valve housing 525 may be provided with a conduit 565 configured to fluidly connect the fuel inlet 185 with the fuel source 190. The shutter 505 can axially translate between a closed position, where it closes the fuel inlet 185, thereby preventing the fuel from flowing into the operating chamber 184, and an open position, wherein it is spaced apart from and opens the inlet conduit 185, thereby letting the fuel flow into the operating chamber 184.

The axial translation of the shutter 505, from the closed to the open position, may be operated by a linear electromagnetic actuator 530, also known as linear solenoid, in contrast with the action of a compression spring 535 that acts on the shaft 510 to bias the shutter 505 towards the open position. The linear electromagnetic actuator 530 is accommodated inside the valve housing 525 and includes a coil winding that can translate the shaft 510 in contrast to the action of the compression spring 535, thereby moving the shutter 505 in the closed position.

The digital inlet valve 500 (in particular to the electromagnetic actuator 530) may be operated by the ECU 450. In particular, the operation of the digital inlet valve 500 generally provides that, during any suction stroke of the piston 182, the electromagnetic actuator 530 is not energized, so that the elastic force of compression spring 535 biases the shutter 505 in the open position. In this way, the depression generated by the piston 182 in the operating chamber 184 draws fuel from the fuel source 190 into the operating chamber 184 via the fuel inlet 185. During the following discharge stroke of the piston 182, the electromagnetic actuator 530 is energized to move the shutter 505 in the closed position. In this way, the pressure inside the operating chamber 184 increases and, when the outlet valve (not shown) opens, the fuel is discharged into the fuel rail 170. It should be observed that the shutter 505 of the digital inlet valve 500 may be closed at any time during the discharge stroke of the piston 182. If the shutter 505 is closed early (i.e. proximate to the beginning of the discharge stroke), almost all the fuel contained in the operating chamber 184 is delivered to the fuel rail 140. If conversely the shutter 505 is closed late (i.e. proximate to the end of the discharge stroke), most of the fuel contained in the operating chamber 184 is routed back to the fuel source 190 via the fuel inlet 185 and only a small quantity of fuel is discharged into the fuel rail 170. As a consequence, by regulating the instant when the shutter 505 opens, the ECU 450 is able to regulate the volume of fuel which is actually supplied into the fuel rail 170.

Figure 4:
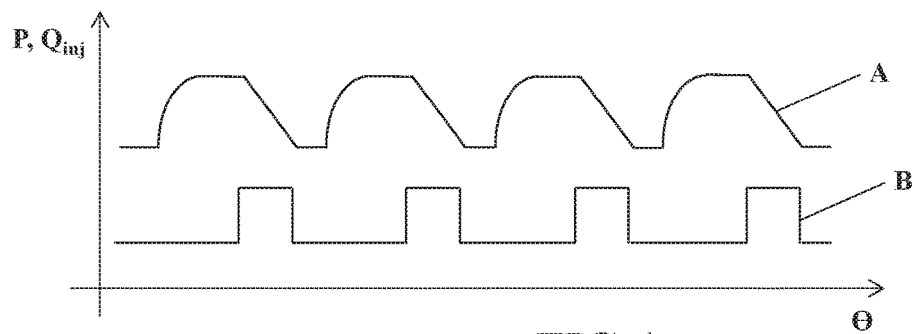
FIG. 4 is a diagram that represents the variation of the fuel rail pressure (curve A) and the fuel injected quantity (curve B) over the crankshaft angular position during the operation of the internal combustion engine of FIG. 2.

In view of the operation of the fuel injectors 160 and the fuel pump 180, the pressure of the fuel within the fuel rail 170 cyclically oscillates as indicated by the curve A in FIG. 4. In particular, any fuel injection performed by a fuel injector 160 in the corresponding combustion chamber 150 (curve B) causes the fuel rail pressure to drop from a high level to a low level. When the fuel injection ends, the fuel rail pressure becomes stable at the low level, until the fuel pump 180 performs a discharge stroke. As explained, the discharge stroke of the fuel pump 180 causes a predetermined quantity of fuel to be supplied into the fuel rail 170, so that the fuel rail pressure raises from the low level back to the high level. When the discharge stroke of the fuel pump 180 ends, the fuel rail pressure becomes stable at the high level, until another fuel injection is performed by another fuel injector 160 in another combustion chamber 150. Afterwards, the fuel rail pressure continues to oscillate in the same way.

Figure 6:
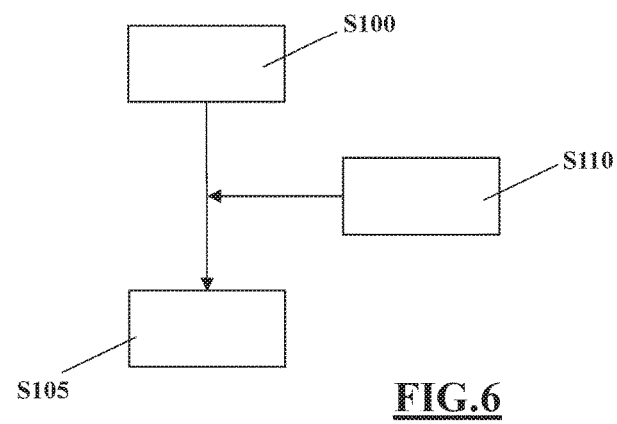
FIG. 6 is a flowchart that represents a method of determining the actual fuel quantity that is injected by a fuel injector.

In order to determine the quantity of fuel which is actually injected by one of the fuel injectors 160 during one fuel injection, the ECU 450 may be configured, as illustrated in FIG. 6, to calculate (block S100) a value of the pressure drop $\Delta P_{inj}$ caused into the fuel rail 170 by the fuel injection and then to calculate (block S105) a value $q_{inj}$ of the fuel quantity actually injected during the fuel injection, on the basis of the calculated value of the pressure drop $\Delta P_{inj}$.

More particularly, the fuel rail pressure drop $\Delta P_{inj}$ can be used to calculate a dynamic fuel quantity $q_{inlet}$ that actually flows through the fuel injector 160 according to the following equation:

$$q_{inlet}=C_{hyd}\cdot\Delta P_{inj}$$

wherein $C_{hyd}$ is the value of the hydraulic capacitance of the fuel rail 170.

The dynamic fuel quantity $q_{inlet}$ may be the sum of two contributions, namely the fuel injected quantity $q_{inj}$ and the dynamic leakage $q_{dyn}$ of the fuel injector 160. The fuel injected quantity $q_{inj}$ is the quantity of fuel that actually enters the combustion chamber 150, whereas dynamic leakage $q_{dyn}$ is a quantity of fuel that, when the injector needle is moved in the open position, flows through a backflow outlet of the fuel injector 160 and returns into the fuel source 190. As a consequence, the dynamic fuel quantity $q_{inlet}$ that globally flows through the fuel injector 160 during a fuel injection (in addition to the static leakage that is always present) may be considered as the sum of the fuel injected quantity $q_{inj}$ and the dynamic leakage $q_{dyn}$:

$$q_{inlet}=q_{inj}+q_{dyn}$$

However, $q_{inlet}$, $q_{inj}$ and $q_{dyn}$ are parameters that depend only on the fuel pressure at the inlet of the fuel injector 160 and on the energizing time (which determines the needle lift). Therefore, knowing $q_{inlet}$, the fuel pressure and the energizing time used to perform the fuel injection, it is possible to determine the value $q_{inj}$ of the fuel injected quantity as a function of $q_{inlet}$:

$$q_{inj}=f(q_{inlet})$$

Once determined, the value $q_{inj}$ of the fuel injected quantity may be used to control the operation of the internal combustion engine 110 in many ways. For example, it can be involved in a closed-loop control strategy of the fuel injected quantity, which may provide for determining the value $q_{inj}$ of the fuel injected quantity according to the method above, calculating a difference e between the calculated value $q_{inj}$ and a predetermined target value $q_{inj}^{*}$ of the fuel injected quantity, and then to use the difference to correct an energizing time to be applied to the fuel injector 160, in order to minimize the error. In particular, the calculated difference may be used as input of a controller, for example a proportional-integrative (PI) controller, that yields as output a correction value to be added to the energizing time, in order to obtain a corrected energizing time that is finally used to operate the fuel injector 160.

Figure 5:
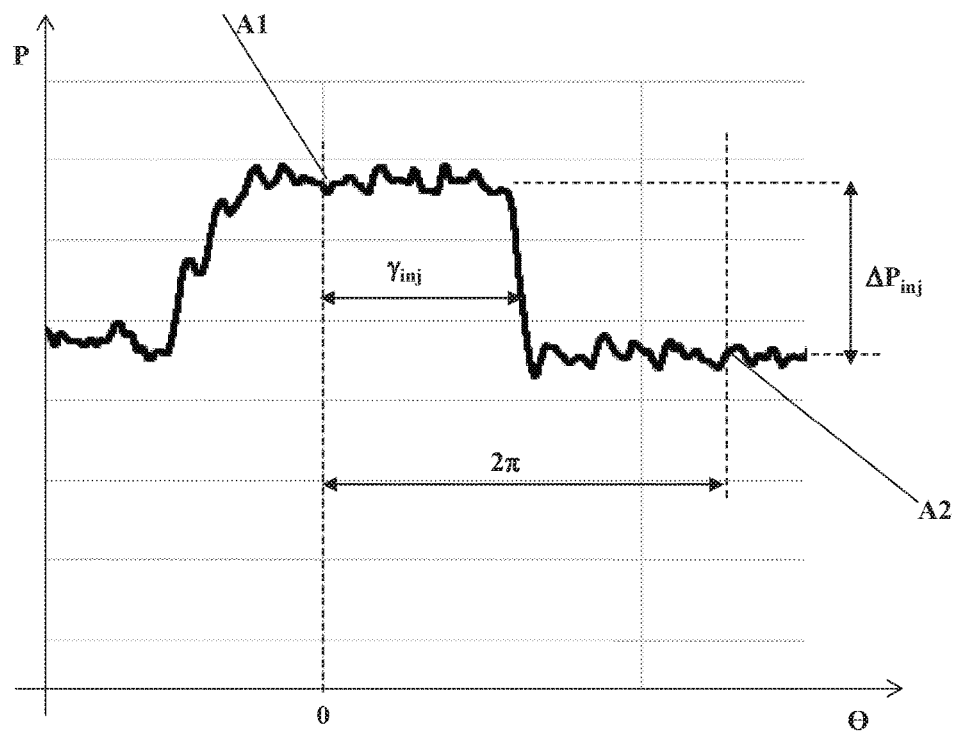
FIG. 5 shows in greater details a portion of the curve A shown in FIG. 4.

Turning now to the determination of the pressure drop $\Delta P_{inj}$ (see FIG. 5), this parameter may be calculated by the ECU 450 through the measurement of two values of the fuel rail pressure, namely a first value A1 and a second value A2. The first value A1 is measured before the start of the fuel injection, in particular between the end of the last discharge stroke of the fuel pump 180 and the beginning of the fuel injection, when the fuel rail pressure is stable at the high level. The second value A2 is measured after the end of the fuel injection, in particular between the end of the fuel injection and the beginning of the next discharge stroke of the fuel pump 180, when the fuel rail pressure is stable at the low level. The pressure drop $\Delta P_{inj}$ is finally calculated by the ECU 450 as the difference between the first and the second value A1 and A2.

In this regard, the two values A1 and A2 of the fuel rail pressure may be measured by the fuel rail pressure sensor 400. In particular, the fuel rail pressure sensor 400 is configured to generate a "rough" electric signal indicative of the pressure within the fuel rail 170. The ECU 450 may be configured to sample the "rough" electric signal generated by the fuel rail pressure sensor 400. By way of example, the "rough" signal may be sampled in an angular domain (i.e. referred to the crankshaft angular position), in order to make it independent from the engine speed. The "rough" signal may then be filtered by the ECU 450, in order to remove pressure oscillations and other noises. By way of example, the "rough" signal generated by the fuel rail pressure sensor 400 may be filtered with a SINC filter, for example a SINC filter tuned on a dominant frequency of the pressure oscillation in the fuel rail. In greater details, the SINC filter may have the following transfer function exposed in a discrete form (according to the mathematical theory of Z transformation applied to the sampled signal):

$$SINC^N(Z) = \left[\frac{1}{OSR} \cdot \left(\frac{1-Z^{-OSR}}{1-Z^{-1}}\right)\right]^N$$

wherein Z is the so-called z-operator, N is the order of the filter and OSR is the so-called oversampling ratio, which is the ratio between the filter data input stream frequency and the filter data output stream frequency.

At this stage, the ECU 450 may be configured to measure two values of this filtered signal, namely a first value sampled between the end of the last discharge stroke of the high pressure pump 180 and the beginning of the fuel injection, and a second value sampled between the end of the fuel injection and the beginning of the next discharge stroke of the high pressure pump 180.

On the basis of the first value of the filtered signal, the ECU 450 may finally calculate the first value A1 of the fuel rail pressure, and analogously, on the basis of the second value of the filtered signal, the ECU 450 may finally calculate the second value A2 of the fuel rail pressure. In particular, the first and the second value A1 and A2 of the fuel rail pressure may be calculated by a model of the fuel rail pressure sensor 400, according to conventional approaches.

In other embodiments, the pressure drop $\Delta P_{inj}$ caused by the fuel injection may be calculated with a different strategy. As can be seen from FIG. 5, it is possible to determine an angular interval that contains the pressure drop $\Delta P_{inj}$ caused by the fuel injection. To this angular interval can be assigned an extension ranging from 0 to $2\pi$, even if this angular interval does not actually correspond to a full rotation of the crankshaft 145 but to a selected portion of it.

Using the angular interval $[0, 2\pi]$ as interval of integration, the alternative strategy may prescribe that the ECU 450 calculates the following integral transforms:

$$L_\alpha = \int_0^{2\pi} P(\theta) \cdot \cos(\theta) d(\theta)$$

$$L_\beta = \int_0^{2\pi} P(\theta) \cdot \sin(\theta) d(\theta)$$

wherein $L_\alpha$ is the value yielded by the first integral transform, $L_\beta$ is the value yielded by the second integral transform, P is the fuel rail pressure as measured by the "rough" signal generated by the fuel rail pressure sensor, $\theta$ is the angular position of the crankshaft, 0 is the predetermined starting value of the integration interval $[0, 2\pi]$ in the crankshaft angular domain, $2\pi$ is the predetermined final value of the integration interval $[0, 2\pi]$ in the crankshaft angular domain.

The pressure P of the fuel rail may be considered as the sum of two contributions:

$$P = P_{eq} + \delta P_{noise}$$

wherein $P_{eq}$ represents an equivalent pressure (e.g. a mean pressure) of the fuel rail 170 and $\delta P_{noise}$ represents the pressure fluctuations due to the pressure waves and electronic noise of the sensor.

As a consequence, the preceding integral transforms may be rewritten as follows:

$$L_\alpha = \int_0^{2\pi} P(\theta) \cdot \cos(\theta) d(\theta) = \int_0^{2\pi} [P_{eq} + \delta P_{noise}] \cdot \cos(\theta) d(\theta)$$

$$L_\beta = \int_0^{2\pi} P(\theta) \cdot \sin(\theta) d(\theta) = \int_0^{2\pi} [P_{eq} + \delta P_{noise}] \cdot \sin(\theta) d(\theta)$$

However, the frequency spectrum of the pressure fluctuations $\delta P_{noise}$ is much higher than the frequency spectrum of the equivalent pressure $P_{eq}$, so that the contribution of the pressure fluctuations to the integral transform is negligible:

$$\int_0^{2\pi} \delta P_{noise} \cdot \cos(\theta) d(\theta) \cong \int_0^{2\pi} \delta P_{noise} \cdot \sin(\theta) d(\theta) \cong 0$$

As a consequence, the integral transforms may be rewritten as follows:

$$L_\alpha = \int_0^{2\pi} P(\theta) \cdot \cos(\theta) d(\theta) \cong \int_0^{2\pi} P_{eq} \cdot \cos(\theta) d(\theta) = T_\alpha(\Delta P_{inj}, \gamma_{inj}) = \Delta P_{inj} \cdot \sin \gamma_{inj}$$

$$L_\beta = \int_0^{2\pi} P(\theta) \cdot \sin(\theta) d(\theta) \cong \int_0^{2\pi} P_{eq} \cdot \sin(\theta) d(\theta) = T_\beta(\Delta P_{inj}, \gamma_{inj}) = \Delta P_{inj} \cdot (1 - \cos \gamma_{inj})$$

wherein $\Delta P_{inj}$ is the fuel rail pressure drop caused by the fuel injection, $\gamma_{inj}$ is the angular distance of the fuel injection from the staring value 0 of the integration interval $[0, 2\pi]$, $T_\alpha$ and $T_\beta$ are two functions having as variables the fuel rail pressure drop $\Delta P_{inj}$ and the angular distance $\gamma_{inj}$.

After having calculated the values $L_\alpha$ and $L_\beta$, the ECU 450 may thus calculate the fuel rail pressure drop $\Delta P_{inj}$ and the angular distance $\gamma_{inj}$ with the following equations:

$$\Delta P_{inj} = -\frac{L_\alpha^2 + L_\beta^2}{2L_\beta}$$

$$\gamma_{inj} = \arcsin\left(-\frac{2L_\alpha L_\beta}{L_\alpha^2 + L_\beta^2}\right)$$

The angular distance $\gamma_{inj}$ provides a measurement of the Start of Injection (SOI), whereas the fuel rail pressure drop $\Delta P_{inj}$ can be used to calculate the fuel quantity actually injected by the fuel injection. It should be noted that, according to this alternative approach, there is no need of filtering the "rough" signal generated by the fuel rail pressure sensor 400, because the impact of the noises on the calculation is negligible.

Regardless from the strategy used to calculate the pressure drop $\Delta P_{inj}$, it happens sometimes that, under certain operating conditions (especially when the engine 110 is operating at high speed and/or high load), the fuel injection actually ends after the beginning of the following discharge stroke of the fuel pump 180, with the consequence that the fuel rail 170 receives additional fuel from the fuel pump 180 while the fuel injector 160 is still open.

Figure 7:
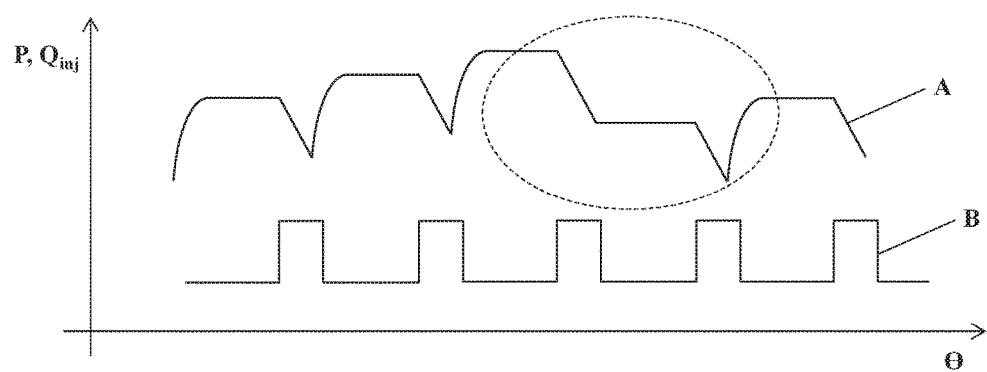
FIG. 7 is a flowchart that represents the variation of the fuel rail pressure (curve A) and the fuel injected quantity (curve B) over the crankshaft angular position during the repetition of the method of FIG. 6.

Hence, the fuel rail pressure starts to rise towards the high level before having reached the low level (see curve A of FIG. 7) and it becomes impossible (or at least very difficult) to determine the real pressure drop $\Delta P_{inj}$ caused by the fuel injection.

As indicated in FIG. 6, in order to solve this drawback, the ECU 450 may be configured to deactivate (block S110) the discharge stroke of the high pressure pump 180 that immediately follows the fuel injection for which the pressure drop $\Delta P_{inj}$ has to be determined.

Summarizing, the ECU 450 may be configured to operate the fuel injector 160 to perform the fuel injection, to deactivate the first discharge stroke of the high pressure pump 180 that follows the start of the injection, to calculate the value $\Delta P_{inj}$ of the pressure drop caused by the last fuel injection started before the deactivated discharge stroke, and finally to calculate the value of the fuel quantity injected by the fuel injection on the basis of the calculated value $\Delta P_{inj}$ of the pressure drop (e.g. according to one of the strategies described above).

By deactivation of the discharge stroke of fuel pump 180 is generally meant to prevent the discharge stroke from delivering fuel into the fuel rail 170. The ECU 450 may operate such deactivation by the digital inlet valve 500. In particular, the ECU 450 may operate the electromagnetic actuator 530 of the digital inlet valve so that the shutter 505 remains open during the entire discharge stroke of the piston 182. In this way, all the fuel contained in the operating chamber 184 is delivered back into the fuel source 190 and no fuel is actually supplied into the fuel rail 170.

As a result of the deactivation of the discharge stroke of the fuel pump 180, the fuel rail pressure is not increased after the fuel injection (see the portion of the curve A of FIG. 7 within the ellipses) and it is thus possible to reliably use the strategies described above, in order to determine the pressure drop $\Delta P_{inj}$ caused by the fuel injection and the fuel quantity $q_{inj}$ actually injected.

This method of calculating the fuel quantity $q_{inj}$ actually injected during a fuel injection, which involves the deactivation of the following discharge stroke of the high pressure pump 180, may be repeated more than once either for the same fuel injector 160 or for other fuel injectors 160 of the internal combustion engine 110.

In the first case, the ECU 450 may be configured to calculate an average value of all the calculated values $q_{inj}$ of the fuel quantity injected by the same fuel injector 160, in order to achieve a more robust indication of the behavior of such fuel injector 160. In the second case, the ECU 450 gets an indication of the behavior of all the fuel injectors 160 of the internal combustion engine 110.

In any case, the deactivation of the discharge stroke of the high pressure fuel pump has the effect that the pressure level inside the fuel rail 140 tends to fall below the low level (see the portion of the curve A of FIG. 7 within the ellipses), because the fuel injected during the fuel injection is not compensated by the following discharge stroke of the fuel pump 180.

For this reason, some embodiments provides the ECU 450 for "activating" a number of (i.e. one or more) discharge strokes of high pressure fuel pump 180 after the deactivated one, thereby allowing each one of the "activated" discharge strokes to actually deliver fuel into the fuel rail 170. In other words, these embodiments prescribe that the deactivation of the discharge stroke of the high pressure fuel pump 180 (and thus the calculation of the pressure drop $\Delta P_{inj}$ and of the fuel quantity $q_{inj}$) may be repeated by the ECU 450 only after that, in the interim period, a certain number of discharge strokes of the high pressure fuel pump 180 have been executed to actually deliver fuel inside the fuel rail 170.

In this regard, the number of such activated compression strokes may equal to the number of fuel injectors 160 of the internal combustion engine 110. In the explanatory example of a four-injector engine, any deactivation of the discharge stroke of the high pressure fuel pump 180 may be followed by four "activated" discharge stroke of the high pressure fuel pump 180, before being repeated. This solution implies that any deactivation of the discharge stroke of the high pressure fuel pump 180 is correlated to a fuel injection performed by a different fuel injector 160, so that the ECU 450 is able to calculate in sequence the quantity $q_{inj}$ of fuel actually injected by all the fuel injectors 160 of the internal combustion engine 110. Moreover, this solution guarantees that the deactivations of the discharge stroke of the fuel pump 180 have not the same periodicity of the engine cycle, thereby preventing resonance effects on the engine torque.

In this context, the ECU 450 may be configured to operate each "activated" discharge strokes (in the interim period between two consecutive deactivation) in order to deliver into the fuel rail 170 a volume of fuel having a value Q according to the following equation:

$$Q^* = \frac{n}{n-1} \cdot Q$$

wherein n is the number of fuel injectors 160 and Q is a value of a fuel volume that would have been delivered during the normal operation of the fuel pump 180, namely if all the discharge strokes of the fuel pump 180 had been activated. In this way, each one of the "activated" discharge strokes of the fuel pump 180 delivers more fuel than normally prescribed, thereby guaranteeing that the overall quantity of fuel supplied into the fuel rail 170 during an engine cycle is sufficient for compensating the fuel injections performed by all the fuel injectors 160, notwithstanding one of the discharge strokes of the fuel pump 180 has been deactivated.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment, it being understood that various changes may be made in the function and arrangement of elements described in an exemplary embodiment without departing from the scope of the invention as set forth in the appended claims and their legal equivalents.

What is claimed is:

1. A method of operating an internal combustion engine having a fuel rail in fluid communication with at least one fuel injector and a fuel pump configured to perform a discharge stroke after each fuel injection performed by the fuel injector, the method comprising:
   performing a fuel injection with the fuel injector;
   deactivating the fuel pump during a first discharge stroke following a start of the fuel injection to prevent said first discharge stroke from delivering fuel into the fuel rail;
   calculating a pressure drop value in the fuel rail resulting from the fuel injection; and
   calculating a quantity of fuel injected by said fuel injection based on the pressure drop value.

2. The method according to claim 1 further comprising:
   calculating a difference between the calculated quantity of fuel injected and a predetermined target value thereof; and
   adjusting a subsequent fuel injection using the calculated difference.

3. The method according to claim 2, wherein calculating the pressure drop value comprises:
   measuring a first value of a fuel rail pressure before the start of said fuel injection;
   measuring a second value of the fuel rail pressure after the end of said fuel injection; and
   calculating the pressure drop value as a difference between the first and the second measured values of the fuel rail pressure.

4. The method according to claim 3, wherein measuring the first and second values of the fuel rail pressure comprises:
   sampling a signal representative of the fuel rail pressure;
   filtering the signal to obtain a filtered signal;

measuring a first value of the filtered signal before the start of said fuel injection;

measuring a second value of the filtered signal after the end of said fuel injection; and calculating the first value and the second value of the fuel rail pressure on the basis of the first and the second value of the filtered signal respectively.

5. The method according to claim 4, wherein the filtering of the signal is performed with a SINC filter.

6. The method according to claim 5, wherein the SINC filter is tuned on a dominant frequency of a pressure oscillation in the fuel rail.

7. The method according to claim 2, wherein calculating the pressure drop value comprises:

sampling a pressure signal representative of the fuel rail pressure during the fuel injection, performing a first integral transform on the pressure signal to yield a first function value based on the fuel rail pressure drop caused by the fuel injection and a timing parameter indicative of an instant when the fuel injection started;

performing a second integral transform on the pressure signal to yield a second function value based on the fuel rail pressure drop caused by the fuel injection and the timing parameter indicative of the instant when the fuel injection started;

calculating the pressure drop value based on the first function value and the second function value.

8. The method according to claim 2, further comprising activating a number of discharge strokes following the deactivated discharge stroke for delivering fuel into the fuel rail.

9. The method according to claim 8, wherein the number of activated pump strokes is equal to the number of fuel injectors.

10. The method according to claim 9, wherein the activation of each discharge strokes comprises delivering a volume of fuel into the fuel rail having a value Q* according to the following equation:

$$Q^* = \frac{n}{n-1} \cdot Q$$

wherein n is the number of fuel injectors and Q is a value of a fuel volume that would have been delivered if all the discharge strokes had been activated.

11. The method according to claim 2, wherein the internal combustion engine comprises a cylinder, a reciprocating piston which is accommodated inside the cylinder, an operating chamber and an inlet valve, the method further comprising:

reciprocally moving the piston in a first direction along a suction stroke to fill the operating chamber with fuel coming from a fuel source;

reciprocally moving the piston in a second direction opposite the first direction along a discharge stroke that delivers fuel to the fuel rail;

operating the inlet valve for controlling admission of fuel into the operating chamber; and keeping the inlet valve open during the discharge stroke of the piston for deactivating the first discharge stroke.

12. A non-transitory computer readable medium comprising processor-executable instructions for reading data from a processor in communication with the fuel injector and the fuel pump, the processor-executable instructions when executed on the processor in a device configured to carry out the method according to claim 2.

13. An internal combustion engine comprising:

a fuel rail in fluid communication with at least one fuel injectors and a fuel pump configured to perform a discharge stroke after each fuel injection performed by the fuel injectors; and an electronic control unit configured to:

perform a fuel injection with the fuel injector;

deactivate the fuel pump during a first discharge stroke following a start of the fuel injection to prevent said first discharge stroke from delivering fuel into the fuel rail;

calculate a pressure drop value in the fuel rail resulting from the fuel injection; and calculate a quantity of fuel injected by said fuel injection based on the pressure drop value.

14. A method of operating an internal combustion engine having a fuel pump supplying pressurized fuel to a fuel rail in fluid communication with at least one fuel injector, the method comprising:

operating a fuel pump inlet valve to control admission of fuel into the fuel pump;

reciprocally moving a fuel pump piston in a first direction during a suction stroke to fill a fuel pump operating chamber with fuel from a fuel source;

reciprocally moving the fuel pump piston in a second direction opposite the first direction during a discharge stroke to deliver pressurized fuel from the operating chamber to the fuel rail;

initiating an injection of pressurized fuel from the fuel rail through the fuel injector;

opening the fuel pump inlet valve during the first discharge stroke after initiating the injection to deactivate the fuel pump and cease delivery of pressurized fuel into the fuel rail;

calculating a pressure drop value in the fuel rail resulting from the injection;

calculating a quantity of fuel injected by the injection based on the pressure drop value.

* * * * *